(12) United States Patent
Modiano

(10) Patent No.: US 10,187,764 B2
(45) Date of Patent: Jan. 22, 2019

(54) AUTOMATIC ELECTRONIC PAYMENT VIA MOBILE TERMINALS

(75) Inventor: Andrea Modiano, Brussels (BE)

(73) Assignee: EUREKA S.A., Luxembourg (LU)

( * ) Notice: Subject to any disclaimer, the term of this patent is extended or adjusted under 35 U.S.C. 154(b) by 0 days.

(21) Appl. No.: 13/984,609

(22) PCT Filed: Feb. 8, 2012

(86) PCT No.: PCT/EP2012/052138
§ 371 (c)(1),
(2), (4) Date: Aug. 9, 2013

(87) PCT Pub. No.: WO2012/107494
PCT Pub. Date: Aug. 16, 2012

(65) Prior Publication Data
US 2013/0309999 A1 Nov. 21, 2013

(30) Foreign Application Priority Data
Feb. 10, 2011 (IT) .............................. MI2011A0193

(51) Int. Cl.
*H04W 4/24* (2018.01)
*G06Q 20/16* (2012.01)
(Continued)

(52) U.S. Cl.
CPC .............. *H04W 4/24* (2013.01); *G06Q 20/16* (2013.01); *G06Q 20/322* (2013.01); *G07B 15/00* (2013.01)

(58) Field of Classification Search
CPC .... G06Q 20/20; G06Q 20/32; G06Q 20/3278; G06Q 30/0601; G06Q 20/341;
(Continued)

(56) References Cited

U.S. PATENT DOCUMENTS

2006/0253392 A1 11/2006 Davies
2008/0040248 A1* 2/2008 Im .................................. 705/35
(Continued)

FOREIGN PATENT DOCUMENTS

CN 201156262 Y 11/2008
CN 10179074 A 7/2010
(Continued)

OTHER PUBLICATIONS

International Search Report dated Jun. 3, 2012 of PCT/EP2012/052138, filed Feb. 28, 2012, pp. 1-2.
(Continued)

*Primary Examiner* — Lester Kincaid
*Assistant Examiner* — Gary Lafontant
(74) *Attorney, Agent, or Firm* — Brooks Kushman P.C.

(57) ABSTRACT

A system and method for automatic electronic payment based on the detection of a mobile station adapted to operate in a cellular telecommunications network. The system and method transmit, on the part of a transmitter associated with a Near Field Focused (NFF) base station, which is external to the cellular telecommunications network, a signal that indicates the presence of the NFF base station by mimicking the signal of an antenna of the cellular network. A request for connection to the NFF base station that originates from the mobile station is detected. An identity request signal to the mobile station is transmitted. The system and method detect an identity reply signal sent by the mobile station. Identification data of a subscriber is determined. The subscriber is billed on the basis of the determined subscriber identification data.

12 Claims, 7 Drawing Sheets

(51) Int. Cl.
*G06Q 20/32* (2012.01)
*G07B 15/00* (2011.01)

(58) Field of Classification Search
CPC ...... G06Q 20/04; G06Q 40/025; G06Q 10/06;
G06Q 30/0238; G07F 7/1008; H04L
12/14; H04L 12/1446; H04M 15/80;
H04M 15/8033
USPC ....... 370/328, 395.21; 455/406, 415; 705/35
See application file for complete search history.

(56) References Cited

U.S. PATENT DOCUMENTS

| | | | |
|---|---|---|---|
| 2008/0215878 A1 | 9/2008 | Gemmo | |
| 2009/0011749 A1* | 1/2009 | Chuang | H04M 3/436 455/415 |
| 2009/0109977 A1* | 4/2009 | Valluru | H04W 28/16 370/395.21 |
| 2010/0027469 A1* | 2/2010 | Gurajala et al. | 370/328 |
| 2011/0177836 A1* | 7/2011 | Iwata | H04W 36/30 455/507 |

FOREIGN PATENT DOCUMENTS

| | | |
|---|---|---|
| JP | 2001351044 A | 12/2001 |
| JP | 2003331203 A | 11/2003 |
| JP | 2007241670 A | 9/2007 |
| JP | 2008134935 A | 6/2008 |
| JP | 2009188629 A | 8/2009 |
| WO | 200120844 A1 | 3/2001 |
| WO | 2010141456 A2 | 12/2010 |

OTHER PUBLICATIONS

Italian Search Report dated Sep. 30, 2011 SN IT MI 2011A000193 filed Feb. 10, 2011, pp. 1-2.
Japanese Office Action of corresponding application No. JP 2015-552952, dated Dec. 22, 2015; 6 pages.

* cited by examiner

AUTOMATIC ELECTRONIC PAYMENT VIA MOBILE TERMINALS

CROSS-REFERENCE TO RELATED APPLICATION

This application is the U.S. national phase of PCT Application No. PCT/EP2012/052138 filed on Feb. 8, 2012, which claims priority to Italian Patent Application No. MI2011A000193 filed on Feb. 10, 2011, the disclosures of which are incorporated in their entirety by reference herein.

The present invention relates in general to methods for payment by means of mobile devices, such as mobile telephones or cellular telephones. More specifically, the present invention relates to automated payment transaction systems and to methods that can be performed with signals associated with existing telecommunications networks in which a subscriber is billed on the basis of the mobile station associated with the subscriber.

For reasons of safety, speed and convenience, cash transactions are used less and less frequently. The payment cards are a widely used form of non-monetary transaction. The growing use of credit cards provides ample evidence that consumers prefer to use electronic payment systems rather than carry large amounts of cash.

These types of financial instruments suffer some safety problems and fraud prevention constitutes a significant loss that affects the profits of the payment industry. When cash is lost or stolen, usually there is no possible course apart from accepting the loss. With other financial instruments, loss is not an important problem, but fraud causes substantial losses for the payment industry.

In general, payment cards require the user to pass the card through a card reader or other mechanism and to engage in a formal transaction process that may require more time than desired for user authentication and transaction approval.

Even with the widespread adoption of electronic payment systems, it is clear that there is a growing need for faster, cheaper and more convenient electronic payment systems for completing financial transactions.

In recent years, there has been a development in payment systems and methods based on the use of mobile devices. People now take advantage routinely of additional characteristics supplied by a typical mobile device, such as text messaging, photography and listening to music, because mobile devices have evolved to include integrated capabilities as PDA, MP3, paging or paging system, playback and electronic mail. Therefore, using a mobile phone for electronic payments constitutes a natural evolution of this convergence process.

There has been an explosive growth in mobile telephony devices and in other portable devices. In general, people remember to take with them their mobile phones or cellular telephones, even if they forget to take with them their wallet or their car keys. Mobile devices are omnipresent in many countries in the world. There is, therefore, a great need for integration of payment systems in mobile devices.

Several methods have been proposed for making a payment by using a mobile communications device. Attempts in this direction have been partially successful for different reasons. In many cases, the cellular telephone must have an additional circuit device (or chip) that is used to store account balances and account information, or, as in recent "contactless" technologies, an RFID device that is capable of transmitting the details of the credit card by moving it close to a reader.

In other cases, or in association with the chip, the communications devices use built-in software. The built-in software provides a user interface, which can be used by a buyer to select different fields and enter the details required in order to make a payment. Most of these software applications can be provided only in relatively more expensive mobile communications devices. Moreover, some of the built-in software applications may require an Internet connection in order to complete the transaction.

Another known method for making a payment by using mobile communications devices provides a buyer with an option to make a payment by using his/her prepaid credit. Prepaid credit is the amount of money paid by the buyer to a service provider for his/her mobile communications device. Accordingly, the buyer cannot make any purchases worth more than the total amount of his/her prepaid credit. Moreover, the buyer must remember many details, such as the credit account number, the validation period, and so on, which are required in order to make a payment.

US2010/027469 relates to systems and methods concerning a femto cell service framework, for purchase of femto cell equipment and services, together with customer support for the purchased equipment and services. A point of sale (POS) platform enables the purchase of femtocell equipment based on a set of eligibility criteria. Customer care architecture enables remote troubleshooting of purchased equipment. Remote troubleshooting includes diagnosis and related manipulation of purchased equipment.

US 2006/253392 discloses to a secure payment system for authorised point of sale transactions, enabling users to pay electronically for purchased goods using a handheld device such as a mobile phone. The system includes a client device and a server device. The server device maintains user profiles which enables customisation, for example of transaction receipts and payment methods. Transaction receipts can be transmitted to a preselected location, for example by email or SMS.

The communication between the client device and the server device is a wireless communication which requires additional mobile capabilities further to conventional capabilities of connecting to a telecommunications network of a conventional mobile operator, e.g. infrared communication.

WO01/20844 is related to a system for supplying data in electronic form comprising mobile telephones and a wireless vending machine. The wireless vending machine is able to obtain electronic data from data servers by communicating over a cellular telephone network and to send the electronic data to the mobile terminals over a Bluetooth local network. A user of a mobile telephone is able to interrogate the wireless vending machine to determine the electronic data it contains and to request that at least part of the electronic data be transmitted to the mobile telephone.

From what has been said above, it is evident that what is required is an easier, faster, more convenient and safer method for concluding financial transactions by using a mobile device.

The aim of the present invention is to provide a new system and method for performing a payment transaction with a mobile terminal that overcomes the drawbacks mentioned above.

This aim and these and other objects that will become better apparent hereinafter are achieved by a method for automatic electronic payment based on the detection of a mobile station adapted to operate in a telecommunications network, comprising the steps that consist in: transmitting, on the part of a transmitter associated with a Near Field Focused—NFF—base station, which is external to the cellular telecommunications network, a signal that indicates the presence of the NFF base station by mimicking the signal of an antenna of the cellular network; detecting, on the part of a receiver associated with the NFF base station, a request for connection to the NFF base station that originates from the mobile station; transmitting, on the part of the transmitter, an identity request signal to the mobile station; detecting, on the part of the receiver, an identity reply signal sent by the mobile station; determining identification data of a subscriber who is associated with the mobile station on the basis of the detected identity reply signal; and billing the subscriber on the basis of the determined subscriber identification data, characterized in that the billing step comprises the steps of: sending, on the part of a communications device associated with the NFF base station, the subscriber identification data and an amount to be paid to a server; extracting, on the part of the server, a plurality of billing parameters associated with the subscriber; sending, on the part of the server, the plurality of billing parameters and the amount to be paid to a payment server; and billing, on the part of the payment server, the amount to be paid to the subscriber on the basis of the plurality of payment parameters.

The term NFF base station hereby indicates a local base station, which is not part of a conventional telecommunications network, having capabilities, derived from conventional telecommunications base stations, sufficient to let a mobile phone camp to it when the mobile is in proximity of the NFF base station and the signal coining from the NFF base station is therefore stronger than signals coining from conventional base stations that are part of the telecommunications network. The NFF base station is also intended to be configured in a way which allows to communicate with a conventional mobile device, as it will be better explained in the following. The NFF base station may be also indicated through the term "local base station".

Further characteristics and advantages of the present invention will become better apparent from the detailed description of particular but not exclusive embodiments, illustrated by way of non-limiting example in the accompanying drawings, wherein.

Figure 1:
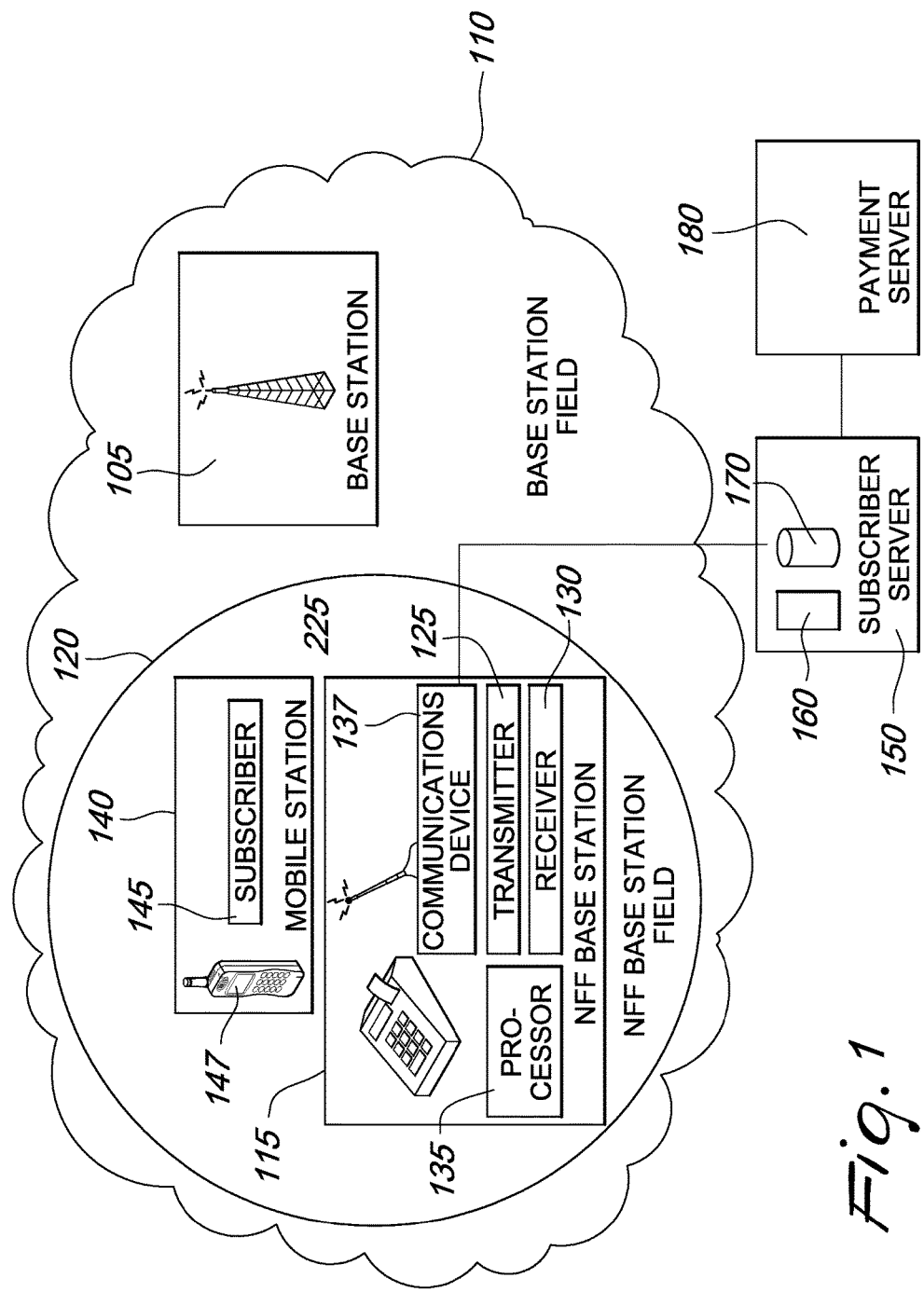
FIG. 1 is a a block diagram of a system for payment transaction with a mobile device according to an embodiment of the invention.

A high-level representation of an electronic payment system using a mobile device according to the present invention is illustrated in FIG. 1. The figure illustrates a base station 105, with a base station field 110, a base station 115 of the Near Field Focus (NFF) type, with a NFF base station field 120, the base station 115 comprising a transmitter 125, a receiver 130, a processor 135, and a communications device 137; the figure also shows a mobile station 140, which comprises a subscriber 145 and a mobile device 147, a subscriber server 150, which comprises a subscriber engine 160 and a subscriber database 170, and a payment server 180.

The base station 105, which can also include a base station transmitter and a base station control unit, is generally a component of a mobile telephone network such as a network of the Global System for Mobile Communications (GSM) or a Universal Mobile Telecommunications System (UNITS) network. Another network might be used which includes any third-generation (3G) network or the like. The base station 105 typically provides a radio interface to a mobile station, such as a mobile phone or a cellular telephone, so that the mobile phone is connected to the network (i.e., "in field") and is capable of sending and receiving calls. Because of the extensive coverage of GSM, UNITS and other mobile telephone networks, the mobile station 140 will fall often within a geographical location covered by one or more base stations 105, but the mobile station 140 needs not to be localized within the interval or field of the base station 105. The base station 105 typically is part of a mobile telephone network, and a mobile phone must have the reception necessary to make or receive a telephone call.

The whole system can be included within the field 110 of one or more base stations 105. The base station field 110 is generally the geographic area on which the base station 105 transmits a signal strong enough to be used in mobile phone communications. There is generally a base station field 110 that corresponds to each base station 105.

The NFF base station 115 generally has the same functional characteristics as the base station 105. However, the NFF base station 115, unlike the base station 105, is external to the network to which the base station 105 belongs, and more generally does not belong to any GSM mobile telephone network (or network of another kind). The NFF base station 115 mimics the signals of GSM base stations such as the base station 105, but it is designed to collect information for automated payment transactions and not for mobile phone communications. Therefore, the NFF base station 115 generally does not connect outgoing or uplink calls. Since the NFF base station 115 rejects requests for an uplink call, any mobile phone that makes such requests is typically forced to select a network associated with the base station 105.

The NFF base station 115 behaves generally like the base station 105 with respect to a mobile phone, and in relation to the base station 105, the NFF base station 115 behaves like a mobile phone. The NFF base station 115 generally sends signals on a NFF base station geographic field 120. The NFF base station field 120 may be partially or completely within the geographical area of the base station field 110. In this case, the NFF base station field 120 may include the geographic area where the signals transmitted by the NFF base station 115 are stronger than the signals transmitted by the base station 105. As an alternative, the NFF base station field 120 might not overlap the base station field 110 at all, i.e., the NFF base station field 120 may comprise a field in which there is no GSM or UNITS coverage.

Figure 6:
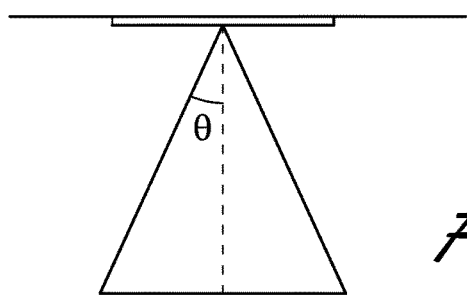
FIG. 6 is a specification of the dimensions of a microstrip antenna according to the present invention.

In one embodiment, the NFF station base field 120 may be set so as to supply a stronger signal in a circular area arranged approximately 1.5 in below the NFF base station, with a limited range, for example between 40 cm and 100 cm, as shown in FIG. 6. This preferred dimension and shape of the NFF base station field 120 make the system and the method according to the present invention suitable for use proximate to a checkout counter where a payment is required, for example in a shop, supermarket or theater. Any other shape or dimension may be selected according to the requirements.

The NFF base station 115 may also comprise one or more transmitters 125, receivers 130, processors 135, and communications devices 137. The transmitter 125 generally includes an electronic device that generates and amplifies a carrier wave, modulates it with a signal, such as a signal that is obtained from speech or other sources, and broadcasts the resulting signal from an antenna. The transmitter 125 may be integral or otherwise associated with the NFF base station 115.

The receiver 130 generally includes a device capable of detecting and capturing input radio frequency signals. Like the transmitter 125, the receiver 130 also may be integral or otherwise associated with the NFF base station 115.

The processor 135 typically includes a central processing unit or another part of a computer that includes data processing logic in order to process data, for example by converting the data from one format to another format. The processor 135 may be a component of the NFF base station 115; however, the processor 135 may also be located remotely with respect to the NFF base station 115. The processor 135 can be associated directly or indirectly with the NFF base station 115.

The communications device 137 typically includes a central processing unit or another part of a computer that includes means and a logic for sending and receiving data on a communications network.

The system, moreover, typically includes at least one mobile station 140. The mobile station 140 generally includes a physical device such as a radio transmitter, a display monitor, a digital signal processor. As its name implies, the mobile station 140 is generally mobile and therefore can move through all or part of an NFF base station field 120. In a preferred embodiment of the present invention, the mobile station 140 comprises a mobile device 147 in the form of a cellular telephone.

The mobile station 140 may comprise, moreover, a Subscriber Identity Module (SIM), also known as "smart card" or "SIM card". Typically, all the mobile stations 140 have a SIM, otherwise the mobile stations 140 would only be able to make emergency calls and position updating would not be performed. Position updating is generally necessary for the mobile station 140 to switch its connection from one base station 105 to another base station 105 (or to the NFF base station 115) when the mobile station 140 changes position. A mobile station 140 without a SIM has no reason to let the GSM or UNITS networks know where it is located because no one can reach it. Therefore, in one embodiment of the invention, a SIM may be necessary in order to activate the GSM or UMTS network and provide awareness of the position and an update of position. However, this embodiment does not require any functionality of the SIM or of its operator.

The hardware that comprises the mobile station 140, i.e., the mobile device 147 itself, and not the smart card, includes a unique identifier typically designated as International Mobile Equipment Identity (IMEI). The SIM includes, moreover, a unique identifier known as International Mobile Subscriber Identity (IMSI). The IMEI and the IMSI are mutually independent. The IMEI identifies the mobile phone and the IMSI identifies the smart card.

Generally, the mobile station 140 is registered with a GSM or UNITS network associated with a plurality of base stations 105. The NFF base station 115 generally obtains the International Mobile Equipment Identity number of each mobile station 140 that enters the NFF base station field 120 with no significant GSM network function interference.

The mobile stations 140 select generally a Public Land Mobile Network (PLMN) that is part of the overall GSM or UMTS network. The Public Land Mobile Networks (PLMN) used by base stations 105 are identified by a Mobile Country Code (MCC) as well as a Mobile Network Code (MNC). These codes comprise part of the Location Area Information (LAI) transmitted by the base stations 105. The mobile station 140 listens only to the base stations 105 that are part of the selected PLMN and therefore the NFF base station 115 must transmit the same MCC and MNC signals that are transmitted by the base station 105 so that the mobile stations 140 respond correctly.

The mobile station 140 is associated generally with a subscriber 145. The subscriber 145 is generally a person that participates in the systems and methods for automatic electronic payment defined by the present invention. In one embodiment, the subscriber 145 agrees to these forms of automatic electronic payment and the subscriber 145 generally has the mobile station 140 with him/her when he/she moves through the NFF base station field 120.

The mobile station 140 will connect typically, or will "camp" on the base station associated with the strongest signal received by the mobile station. The signal intensity of this camping is often indicated visually by the mobile station 140. For example, the screen of a mobile phone (mobile device 147) will show the intensity of the signal that the mobile phone is receiving in its current location. When the mobile station 140, which is currently camped on a mobile station 105, moves towards another geographical location, it generally encounters another base station field associated with another base station 105. If the intensity of the signal of this second base station 105 becomes stronger than the intensity of the signal of the base station on which the mobile station 140 is currently camped, the mobile station 140 will switch its camping from the previous base station 105 to the new base station 105. At this point, the mobile station 140 is camped on the new base station 105. In this manner, the mobile station 140 is generally camped on, or connected to, the base station 105 that has the strongest signal in a particular geographic area. Therefore in the NFF base station field 120, where the signal of the NFF base station 115 is stronger than the signal that originates from the base station 105, the mobile station 140 will camp on the NFF base station 115 and not on the base station 105.

Likewise, if the mobile station 140 is not located within the base station field 110 (and therefore is out of range and has no cellular telephony service), and then enters the NFF base station field 120, the mobile station 140 will camp on the NFF base station 115.

In particular, in one embodiment, the mobile station 140 is arranged in a clearly identifiable area, for example on a mat or in an open container, in which the field signal of the NFF base station 115 is channeled so as to be greater than any field signal coining from nearby base stations.

The system moreover includes typically at least one subscriber server 150. The subscriber server 150 may include one or more subscriber engines 160 and one or more subscriber databases 170.

The subscriber engine 160 may be integral with, or otherwise associated with, the subscriber server 150. The subscriber engine 160 is responsible for receiving and sending information to the communications device 137, communicating with the payment server 180, and finding and storing information in the subscriber database 170. The information exchanged between the subscriber engine 160 and the communications device 137 typically include subscriber authentication data, such as the IMEI number of the mobile device 147, the amount to be paid and the authorization to continue the payment.

The subscriber database 170 may be integral with, or otherwise associated with, the subscriber server 150. Typically, the subscriber database 170 comprises an entry for each subscriber who has subscribed the service, and each entry includes information that associates the subscriber 145 with the details of a method of payment. In one embodiment, the information related to the subscriber 145, such as the IMEI number of his/her mobile device 147, and the details of methods of payment comprise his/her credit card number, but other forms of authentication data and payment method details are also possible, for example the IMSI number and a bank account identifier.

The system, moreover, typically includes at least one payment server 180. The payment server 180 can be an independent server and can also be integral with, or otherwise associated with, the subscriber server 150. Generally, the payment server 180 can be managed by a party that is different than the one that manages the subscriber server. The payment server 180 is responsible for billing to the subscriber on the basis of the information received from the subscriber server 150. In one embodiment, the payment server 180 is an independent server managed by a credit card company, modified so as to make it capable of receiving billing requests from the subscriber server 150.

Operation of the system according to the present invention will be now described with reference to FIG. 2.

Figure 2:
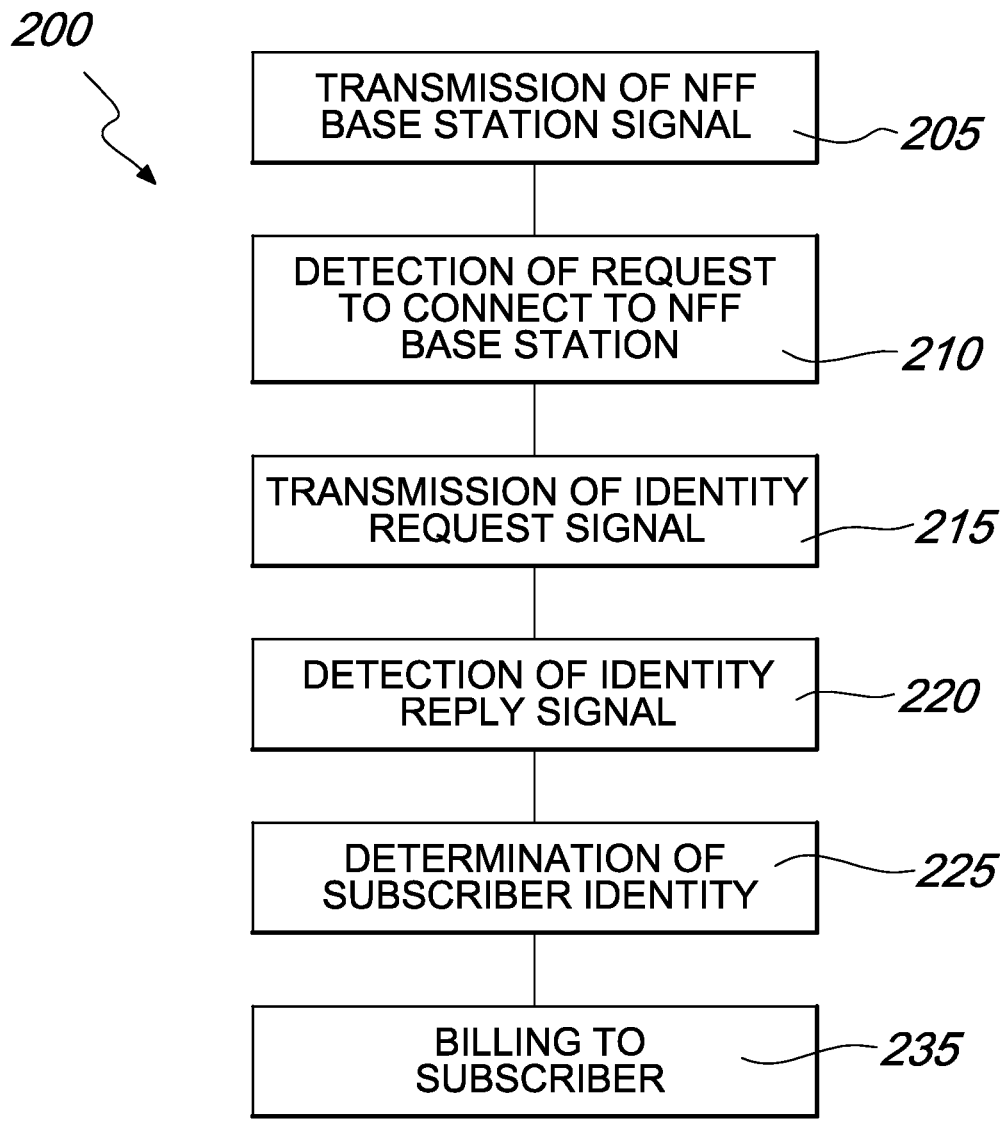
FIG. 2 is a flowchart of a method for payment transaction with a mobile device according to an embodiment of the invention.

FIG. 2 is a flowchart of a method 200 for automatic electronic payment on the basis of the detection of a mobile station according to an embodiment of the invention. The method 200 starts with the step of transmission of an NFF base station signal (STEP 205) by the transmitter 125. This is a signal that indicates the presence of the NFF base station 115 and, as previously mentioned, the NFF base station 115 transmits it mimicking the signal transmitted by a base station 105 of the cellular telecommunications network, as will be described in detail hereinafter. The transmission of the NFF base station signal (STEP 205) may occur by using an antenna, such as for example a sectored antenna, in order to control precisely the geographical area over which the signal is transmitted. However, other types of antennas, for example omnidirectional antennas, can be used. In a preferred embodiment, a microstrip array near-field focused antenna with circular polarization is used, as shown in detail in FIGS. 4 to 11. The transmission of the NFF base station signal (STEP 205) can include transmitting the signal as Radio Frequency (RF) signal.

After the transmission of the NFF base station signal (STEP 205), the method 200 proceeds with the step that consists in detecting a request by a mobile station to connect to the NFF base station (STEP 210). The detection step (STEP 210) can be performed by using a receiver 130 associated with the NFF base station 115, and the detected signal can include a radio frequency signal or other type of wireless signal or transmission. The signal can be detected in any manner or position, provided that this detection (STEP 210) is communicated to the logic unit associated with the NFF base station 115, i.e., the processor 135. Typically, the request for connection to the NFF base station originates from a mobile station 140. After detecting a request from a device such as a mobile station 140 to connect to the NFF base station 115 (STEP 210), the method 200 proceeds to transmit an identity request signal (STEP 215) to the mobile station 140. Generally, the purpose of this transmission (STEP 215) is to request information that identifies uniquely the source of the request for connection to the NFF base station 115 that had been received during the receiving step (STEP 210). The transmission of the identity request can be performed by any means, including the transmitter 125 used to transmit the NFF base station signal (STEP 205).

Once an identity request signal has been transmitted (STEP 215), the method 200 waits for the detection of an identity reply signal (STEP 220). Generally, this identity reply signal is a signal that identifies uniquely the device that has requested to connect to the NFF base station 115. In several embodiments, the STEP 220 can include the detection of an International Mobile Equipment Identity (IMEI) associated with the device, where the device can be a mobile device such as the mobile device 147.

At this point of the method 200, a base station 115 that transmits its signal on a specific geographical area 120 (STEP 205) has received a request from a mobile device 145 to connect to the NFF base station 115 (STEP 210) and has transmitted an identity request signal (STEP 215) and received (STEP 220) an answer to this request that identifies the device. The method 200 proceeds typically with the step that consists in determining subscriber identification data (STEP 225), in which the identification data of a subscriber typically comprise information related to the person who carries the device. Typically, this step entails verifying an association between the device, which is identified by the means of the identity reply signal detected in step 220, and a person, such as the owner of the device. In other words, the device, which can be a mobile station such as a mobile phone, is associated with a person, such as the owner of the mobile device.

In some embodiments, the identity of the subscriber is verified by means of a database of the subscribers to these automated payment systems and methods. This database may be integral with, or otherwise associated with, the NFF base station 115; in some embodiments this database may be the subscriber database 170 and the verification can include an exchange of information on a network between the communications device 137 and the subscriber server 150. In this case, if the identity of the subscriber is present in the database, then the automated payment procedure will occur; if the subscriber identity information is not present in the database, then the user is not registered with these payment systems and methods and must pay any billing in a conventional manner. This illustrative embodiment prevents unauthorized billings without the consent of the owner of a mobile device, and may be useful in situations in which, for example, in a family of four people in which each one has a mobile phone, the family is proximate to the NFF base antenna, and only one person wants to be billed. In such a case, only one member of the family would have his/her identity included in the database verified as part of STEP 225 in order to authenticate subscriber identity.

Once a subscriber associated with the device has been identified (STEP 225), the method 200 proceeds generally with the step that consists in billing the subscriber (STEP 235). Generally, billing the subscriber includes billing the subscriber with a monetary amount due for purchased goods or services. Billing can occur (STEP 235) in different manners. For example, billing (STEP 235) may include a form of current account billing or sending an invoice electronically or by standard mail. The billing to a subscriber (STEP 235) can also be linked to a credit card associated with the subscriber.

Figure 3:
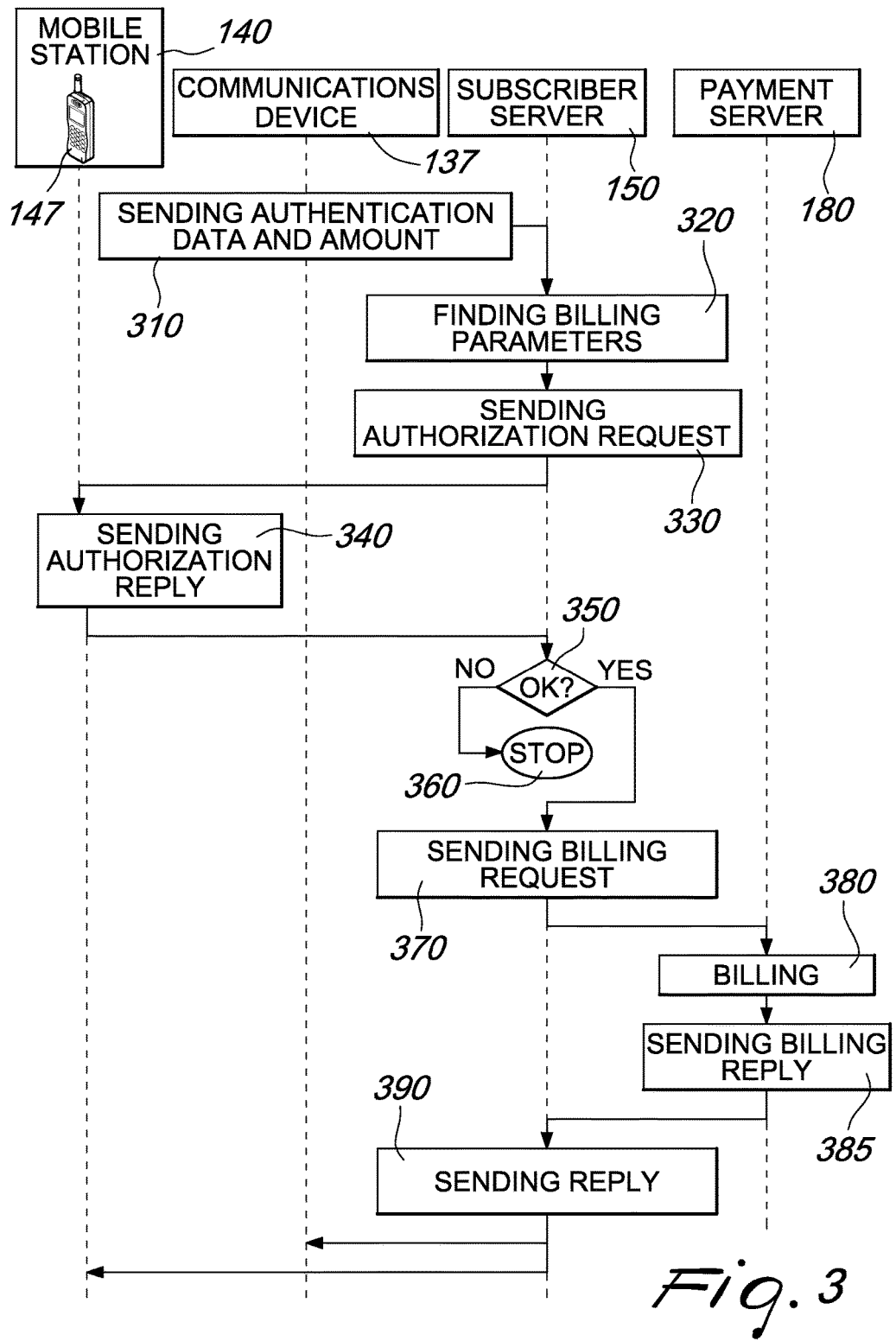
FIG. 3 is a flowchart of a possible embodiment of the billing step to a subscriber according to the present invention.

FIG. 3 is a more detailed view of a possible embodiment of the step 235 of billing a subscriber according to the present invention.

The method 300 starts with the communications device 137 that performs the step that consists in sending subscriber identification data, typically the IMEI number of the detected mobile device 147 and the amount to be billed, typically the amount that must be paid, to the subscriber server 150 (STEP 310).

The subscriber server 150, following reception of the previously described data, proceeds to extract billing parameters associated with the subscriber (STEP 320). These billing parameters may include any information necessary to invoice, tariff or bill an amount to the subscriber. Extraction of the billing parameters may be performed with any means and may involve a processor that processes data associated with the subscriber. The billing parameters can be extracted by acquiring said information from the subscriber database 170, where the billing parameters are associated with the identified subscriber.

It should be noted that since in step 225 user identity has already been authenticated, the acquisition of step 320 will be successful.

The subscriber server 150 then proceeds to send an authorization request to the mobile device 147 (STEP 330). This authorization may be sent to the mobile device 147 in the form of a pseudo SMS message, i.e., a message that appears on the screen of the mobile device 147 but is not transmitted by means of the GSM network. Following the reception of the authorization request, the mobile device 147 sends an authorization reply (STEP 340), which indicates whether the transaction is authorized. In one embodiment, the subscriber 145 replies by clicking on the accept or reject keys of the mobile device 147, usually used in order to accept or reject a call.

In step 350 the subscriber server 150 evaluates the received authorization reply, in order to decide whether to proceed with the transaction; in particular, the subscriber server 150 verifies whether the authorization reply is negative or positive: in the first case, the method stops and the payment is not performed (step 360); in the second case, the subscriber server 150 sends a payment request to the payment server 180 (step 370); the request comprises all the useful billing data acquired in step 320 and the amount of money received in step 310.

As described previously, billing may occur in a variety of manners, depending on the billing methods stored in the subscriber database 170. For example, subscriber billing can be linked to the credit card associated with the subscriber or can comprise a form of automatic billing on a current account. In the first case the billing parameters comprise a credit card number and the billing step comprises billing the credit card associated with the stored credit card number; in the second case the billing parameters comprise a bank account identifier and the billing step comprises billing the bank account associated with the stored bank account identifier.

Depending on the billing method, in step 370 the subscriber server 150 sends a billing request to a suitable payment server 180. In step 380 the payment server 180 bills the required amount to the subscriber and then in step 385 sends a reply to the subscriber server 150. The reply may be positive, if the payment has gone through, or negative, for example if the current account balance is negative or the limit of the credit card has been exceeded. In any case, in step 390 the subscriber server 150 forwards this reply to the communications device 137 and/or to the mobile device 147.

Going back now to FIG. 1, in a general embodiment of the invention the transmitter 125 transmits a signal that indicates the presence of the NFF base station 115. This signal is generally in the frequency domain that corresponds to an assigned Broadcast Control Channel Allocation List (BCCH list, or BA list). This BA list corresponds to the frequency domain in which the base stations are enabled to transmit in order to provide bandwidth for mobile stations. The transmitter 125 of the NFF base station 115 generally transmits frequencies in the same frequency range as the base stations 105. The geographical area covered by the signal transmitted by the transmitter 125 forms the NFF base station field 120, which is generally either the area where the mobile station can receive the signal or the area where the signal from the transmitter 125 is stronger than the signal from any base station field 110. In both cases, the mobile station 140 typically camps on the NFF base station 115 when the mobile station 140 enters the NFF base station field 120.

When the mobile station 140 enters the NFF base station field 120, it generally transmits a request to camp on, i.e., to connect, to the base station 115. Accordingly, the receiver 130 generally detects a request on the part of the mobile station 140 to camp on the NFF base station 115. The NFF base station 115 can then allow the mobile station 140 to camp on it; the mobile station 140 therefore makes a connection to the NFF base station 115.

After reception of the request on the part of the mobile station 140 to connect to the NFF base station 115, the transmitter 125 can transmit an identity request signal to the mobile station 140. This identity request may include an International Mobile Equipment Identity request (IMEI) of the mobile station 140. The mobile station 140, following the reception of this request, sends an identification signal in reply. The receiver 130 typically detects this identity reply signal that identifies uniquely the mobile station 140. This may include the detection of the International Mobile Equipment Identity associated with the mobile station 140. Generally, the identification signal such as the IMEI may be accessed by the NFF base station 115 without interfering with other mobile services. Typically, the identity request signal (sometimes termed identity request message) is composed of a concatenation of several fields. One field of the identity request signal is an Identity Type field, and an identity request signal in order to request the IMEI of the mobile station 140 can be obtained by setting the identity type field to a binary signal 010. In this case, the mobile station 140, upon receiving this identity request signal, replies by transmitting an identity reply signal that includes the IMEI of the mobile station 140. At this point the processor 135 has all the information necessary in order to identify uniquely the mobile station 140 that is located within the NFF base station field 120. In many situations a plurality of mobile stations 140 can be identified as all located within the NFF base station field 120 simultaneously. The processor 135 can also authenticate the identity of a subscriber 145 associated with the mobile station 140. The subscriber 145 is generally a person who has agreed (expressly or implicitly) to the automated payment methods described in the present invention. The subscriber 145 may agree, for example, by associating his/her name with the identity of the mobile station 140 such as the IMEI or IMSI and allowing this information to be stored in a database used for payment purposes. The processor 135 can then verify that the identifier of the mobile station 140 is present in this database in order to determine whether the subscriber 145 is enabled for this form of automated payment.

If the subscriber 145 is enabled for this form of payment, the processor 135 typically proceeds to bill the subscriber 145 with the amount due. This may include creating and sending an invoice to the subscriber 145 or any form of pre-authorized automatic withdrawal or payment with credit card.

As described previously, billing to the subscriber comprises a cooperation between the processor 135, the communications device 137, the subscriber server 150 and the payment server 180.

Generally, the systems and methods of the present invention are compatible with existing mobile stations 140 that include mobile phones that can be used with the Global System for Mobile Communications (GSM) or other networks. Generally, identification depends only on the hardware of the mobile station and not on existing mobile services (offered by mobile operators). Therefore, the systems and methods of the invention generally do not require the use of the Subscriber Identity Module (smart card or SIM card) or its associated International Mobile Subscriber Identity (IMSI) information. In one embodiment, the systems and methods of the invention may identify the subscriber 145 exclusively on the basis of the IMEI information (International Mobile Equipment Identity) associated with the mobile phone itself (mobile station 140).

The systems and methods of the present invention generally access the IMEI number of a mobile phone 147 associated with a mobile station 140 without interfering with standard mobile services provided by GSM or other networks. This can be provided by temporarily allowing the mobile station 140 to connect to (i.e., to camp on) the NFF base station long enough to identify the subscriber 145. If, before entering the NFF base station field 120, the mobile station 140 was camped on the base station 105, then the mobile station 140 disconnects from the base station 105 and connects to the NFF base station 115 as soon as the intensity of the signal of the NFF base station 115 exceeds the intensity of the signal of the base station 105. Generally, once the receiver 130 has received data that identify the mobile station 140 (such as an IMEI signal), the connection between the mobile station 140 and the NFF base station 115 is released; the mobile station 140 can then connect or reconnect to a signal coining from the base station 105, if the mobile station 140 is within the base station field 110. In this manner the mobile station 140 generally connects only to the strongest "cell", which can be the base station 105 or the NFF base station 115.

The mobile station 140 has typically a variety of operational states. For example, the mobile station 140 can be inactive (i.e., in standby), in the process of setting up a call, in the process of receiving a call, or in conversation mode during a call. When the mobile station 140 is already camped on the base station 105, generally a re-selection algorithm is performed which can enable the mobile station 140 to disconnect from the base station 105 and connect to the NFF base station 115. Generally, this requires the NFF base station 115 to operate on a frequency on the Broadcast Control Channel (BCCH) allocation list of the base station 105. The NFF base station must also include, typically, the same Mobile Country Code and the Mobile Network Code as the base station 105. Moreover, the NFF base station must have a path loss criterion ("C1") that is greater than zero, as indicated in the following computer code sample.

The parameter related to the path loss criterion C1 used for selection and re-selection of the cells is defined by:

$$C1 = (A - \text{Max}(B, O))$$

where A=Received Level Average—RXLEV_ACCESS_MIN
B=MS_TXPWR_MAX_CCH-P
RXLEV ACCESS_MIN=Minimum level received at the mobile station required in order to access the system
MS_TXPWR_MAX_CCH=Maximum level of TXPWR that can be used by a mobile station in accessing the system until otherwise instructed
P=maximum RF output power of the mobile station
All values are expressed in dBm.

The parameters, RXLEV_ACCESS_MIN and MS_TXPWR_MAX_CCH, are transmitted in broadcast on the BCCH of the service cell.

If the NFF base station 115 is not operational due to maintenance or is not working properly, it can be in the "barred" state. In order to debar the NFF base station 115, a Cell Barring Access parameter should be sent.

The NFF base station 115 may have a Localization Area Code different than the one of the base station, such as for example, a base station 105 on which the mobile station 140 may camp if it enters the NFF base station field 120. This generally allows the NFF base station 115 to be aware that a new mobile station, such as the mobile station 140, is camped on it.

The mobile station 140 generally connects to the NFF base station 115 if the calculated value of C1 for the base station 115 is greater than the C1 value of the current service base station, such as the base station 105, by at least CELL_RESELECT_HYSTERESIS dB for a period of time, such as for example 5 seconds. This last parameter is provided by means of the BCCH data that arrive from the service base station. Before camping on the NFF base station 115, the mobile station 140 may attempt to decode the complete group of data (system information) of the BCCH in order to verify the MCC/MNC and the CELL BAR ACCESS. Generally, after a connection has been set up between the mobile station 140 and the NFF base station 115, the system information messages are transmitted between these devices on the SACCH channel (Slow Access Control Channel). The system information generally contains information on BCCH allocation in neighboring base stations, as well as information such as identification of the location area and base station identity.

In a general embodiment, the mobile station 140 connects generally to the base station (either the base station 105 or the NFF base station 115) from which it is receiving the strongest signal. If the Localization Area Code (LAC) of the NFF base station 115 is different from the LAC of the base station 105 on which the mobile station 140 can be currently camped, the mobile station 140 can then set up a connection to the NFF base station 115 and send a request for location update, to which the NFF base station 115 can reply by sending an identity request signal, such as a request for IMEI data, to the mobile station 140.

In an exemplifying embodiment, within a preset base station the C1 of the NFF base station 115 must be CELL_RESELECT_HYSTERESIS greater than the C1 of the base station to which the mobile station 140 is currently connected. Typically, this causes a Current Cell Identity (Location Area Identity, LAI) message to be broadcast. As minimum condition for the selection of the NFF base station 115, the LAC of the NFF base station 115 may be different from the one of the base station to which the mobile station 140 is currently connected. The frequency used by the NFF base station 115 is typically an item of the BA list (BCCH Allocation list) of the current base station, such as the base station 105, and the LAI of the NFF base station 115 contains typically the MCC and the MNC of the network associated with the base station to which the mobile station 140 is currently connected. The mobile station 140 can only scan all the 124 available frequencies if none of the frequencies that are items of the BA list can be received.

Continuing with this exemplifying embodiment, the mobile station 140 can detect the NFF base station 115 and try to connect to it by setting up an RR connection (Radio Resource), i.e., by sending an RR Channel Request message in an access pulse or burst on the RACH (Random Access Channel) of the NFF base station 115.

The NFF base station 115 can then assign a SDCCH channel (Stand-alone Dedicated Control Channel) to the mobile station 140 by sending an RR Immediate Assignment on its AGCH channel (Access Grant Channel), which usually causes the mobile station 140 to send a Location Update Request to the NFF base station 115 on the assigned SDCCH and to start to send Measurement Reports on its SACCH. The NFF base station 115 can then send an Identity request with an Identity Type field equal to 2, which acts as a request for the mobile station 140 to transmit an identity reply with its IMEI data to the NFF base station 115. Finally, the NFF base station can send a Location Update Acceptance and a RR Channel Release.

In one embodiment, after the NFF base station 115 has received data such as IMEI data that indicate the identity of the mobile station 140, it is no longer necessary for the mobile station 140 to remain connected to the NFF base station 115. Therefore, the mobile station 140 can disconnect from the NFF base station 115, after which the mobile station 140 is free to connect (or reconnect) to the base station 105. There are different situations in which the mobile station 140 can select a base station for the connection. For example, if the path loss criterion (C1) for a base station or an NFF base station 115 connected to the mobile station 140 falls below zero for a given period of time, such as for example five seconds. A downlink failure signal, or BCCH data that indicate that the connected base station is barred, also will induce the mobile station 140 to select another base station 105 or NFF base station 115 for the connection. Moreover, if the C1 value for a non-connected base station 105 (or NFF base station 115) exceeds the C1 value of a connected base station 105 (or NFF base station 115) for a period of time such as five seconds, then a stronger signal has been detected. If the new base station (or NFF base station 115) is in a different location area, then the C1 value may be required to exceed the C1 value of the connected base station (or of the NFF base station 115) by at least CELL_RESELECT_HYSTERESIS dB as defined from the BCCH data item that arrives from the base stations currently connected for a period of time, such as five seconds. In some embodiments, if a random access attempt does not succeed after a certain number of attempts, such as the number defined on the BCCH as "*MAX retrans", then the re-selection of a base station or NFF base station 115 can occur.

In a general embodiment, once the identity reply signal such as the IMEI that identifies the mobile station 140 has been received, it is desirable for the mobile station 140 to disconnect from the NFF base station 115 and connect or reconnect to the base station 105 as soon as possible. This is generally indicated as reselection to the authentic network. Generally, this is provided more efficiently by transmitting a downlink signaling failure message from the NFF base station 115 to the mobile station 140.

The downlink signaling failure criterion is generally based on the Downlink Signaling Failure Counter (DSC). When the mobile station 140 is camped on the NFF base station 115 or on the base station 105, the DSC can be initialized to a value equal to the integer closest to 90/N, where N is the BS_PA_MFRMS parameter for that base station 105 or NFF base station 115. Afterwards, the successful decoding on the part of a mobile station 140 in a paging sub-channel causes the DSC to increase by 1 (but never above the integer closest to 90/N), otherwise DSC is decreased by 4. If the DSC becomes equal to zero, a downlink signaling failure is declared and the reselection process starts.

In one embodiment, the reselection process requires approximately 5.3 seconds, according to the following equation:

$$\left. \begin{array}{l} \dfrac{90}{N} - 4F = 0 \\ \Delta P.N.F = \Delta C \end{array} \right\} \Rightarrow \Delta C = \dfrac{90}{4}\Delta P \approx 5.3 \text{ s}$$

where

N is the BS_PA_MFRMS parameter (sent in the system information, in the control channel description) for the base station 105 or for the NFF base station 115;

F is the quantity of corrupted paging messages that the mobile station 140 requires to receive;

NΔP is the time interval between two paging messages for the mobile station 140;

ΔC is the time required in order to generate a downlink signaling failure; and

ΔP=(51×8)×15/26 ins (duration of a multiframe of 51 frames)–235 ms.

In the case of a Mobile Originated Call (uplink call), the process of reselection may be made even faster. Reselection of the base station can occur when the mobile station 140 has received a number equal to "MAX retrans" (a BCCH parameter) of random access attempts that have been unsuccessful. This generally requires to distinguish between a channel request sent by a mobile station 140 in order to perform a location update (often here the ESTABL_CAUSE field in the channel request is equal to zero) and channel requests used to set up a mobile originated call or an emergency call (generally, in these cases the ESTABL_CAUSE field is not equal to zero).

Another way to speed up the reselection process after the NFF base station 115 has received subscriber identity data such as the IMEI of the mobile station 140 can occur by sending a Rejected Location Update message from the NFF base station 115 to the mobile station 140. This makes the mobile station 140 "think" that it is not connected to the NFF base station 115 and therefore the mobile station 140 searches immediately for another base station, such as the base station 105, to which to connect. Different other reselection signals can be used until the mobile station 140 does not become barred or the NFF base station 115 is not labeled as invalid. Some examples of alternative reselection signals include sending a message that indicates that the IMSI is unknown to the Home Location Register (HLR), a message that indicates an illegal mobile subscriber or illegal mobile equipment; a message that indicates that the access to the Public Land Mobile Network (PLMN) associated with the GSM network is denied. Similar messages may also indicate that roaming is not allowed in that particular area, or that the location area is not allowed, which may cause the LAI to be stored in a list of forbidden location areas. The lists of "forbidden location areas for roaming" and "forbidden location areas for regional supply of service" are generally deleted only when the mobile station 140 is off or when the SIM is removed, or periodically (for example every 12 to 24 hours). Another possibility may be to use a different cause of rejection than the ones described above, such as a "further attempt upon entering a new base station" (i.e., a new cell). For example, the causes of rejection may be as indicated hereinafter:

Reject cause value (octet 2)
Bits
8 7 6 5 4 3 2 1
0 0 0 0 0 0 1 0 IMSI unknown in HLR
0 0 0 0 0 0 1 1 Illegal MS
0 0 0 0 0 1 0 0 IMSI unknown in VLR
0 0 0 0 0 1 0 1 IMEI not accepted
0 0 0 0 0 1 1 0 Illegal ME
0 0 0 0 1 0 1 1 PLMN not allowed
0 0 0 0 1 1 0 0 Location Area not allowed
0 0 0 0 1 1 0 1 Roaming not allowed in this location area
0 0 0 1 0 0 0 1 Network failure
0 0 0 1 0 1 1 0 Congestion
0 0 1 0 0 0 0 0 Service option not supported
0 0 1 0 0 0 0 1 Requested service option not subscribed
0 0 1 0 0 0 1 0 Service option temporarily out of order
0 0 1 0 0 1 1 0 Call cannot be identified
0 0 1 1 0 0 0 0 to retry upon entry into a new cell
0 0 1 1 1 1 1 1
0 1 0 1 1 1 1 1 Semantically incorrect message
0 1 1 0 0 0 0 0 Invalid mandatory information
0 1 1 0 0 0 0 1 Message type non-existent or not implemented
0 1 1 0 0 0 1 0 Message type not compatible with the protocol state
0 1 1 0 0 0 1 1 Information element non-existent or not implemented
0 1 1 0 0 1 0 0 Conditional IE error
0 1 1 0 0 1 0 1 Message not compatible with the protocol state
0 1 1 0 1 1 1 1 Protocol error, unspecified Any other value received by the mobile station shall be treated as 0010 0010, 'Service option temporarily out of order'. Any other value received by the network shall be treated as 0110 1111, 'Protocol error, unspecified'.

Generally, when the mobile station 140 receives a Rejected Location Update message with an abnormal cause of rejection, it can react by stopping a timer such as Timer T3210 if it is still working. Timer T3210 starts typically when a Location Update Request Message is sent by the mobile station 140 and is typically stopped when a message of Location Update Acceptance or Rejected Location Update is received as a reply. The Radio Resource Connection is generally aborted when the timer T3210 expires. In this case, the attempt counter is then increased. The subsequent actions depend generally on the Location Area Identities (stored and received by the BCCH of the current service cell) and on the value of the attempt counter. If the update state is UPDATED and the stored LAI is equal to the one received on the BCCH by the current service cell and the attempt counter is below 4, the mobile station 140 can maintain the update state as UPDATED, the MM sub-state (Mobility Management) INACTIVE after the release of the Radio Resource connection (RR) is NORMAL SERVICE (see hereinafter). The mobile station can store the type of location update used in the location update procedure and typically starts the timer T3211 when the RR connection is released.

When the timer T3211 expires, the location update procedure can be triggered again with the stored type of location update, generally either the update state is different than UPDATED or the stored LAI is different than the one received on the BCCH by the current service cell, or the attempt counter is greater than or equal to 4.

The mobile station 140 generally deletes any LAI, TMSI, or number of encryption key sequences stored in the SIM, sets the update state to NOT UPDATED and enter the sub-state MM IDLE ATTEMPTING TO UPDATE when the RR connection is released. If the attempt counter is below 4, the mobile station 140 can store that the timer T3211 must be started when the RR connection is released, otherwise it can store that the timer T3212, which can be used to perform a periodic update, can be started when the RR connection is released. A typical timeout value for T3211 is equal to 15 seconds. This same procedure is followed generally also if a RR connection failure occurs, if the RR connection is released before the normal end of the procedure or if Timer T3210 expires.

When the mobile station 140 is receiving normal service, generally it can perform a location update when it enters a new location area; it can perform a location update procedure when the timer T3211 expires; it can perform a periodic update when the timer T3212 expires; it can perform an IMSI detach; it can support requests from the CM (connection management) layer; or it can reply to paging. When the mobile station 140 is in the ATTEMPTING TO UPDATE sub-state it can perform a location update procedure when the timer T3211 expires, perform the normal location update when the location area identification of the service cell changes, or if the entry into this state had been caused by a random access failure (with a cause other than "abnormal release, unspecified") or by a Rejected Location Update message (with cause "retry upon entry into the new cell"), then the location update can be performed when it enters a new base station 105 or a new NFF base station 115. If the entry into this state had been caused by an "abnormal release, unspecified" condition, or by a Rejected Location Update message (with an abnormal cause other than "retry upon entry into the new cell"), than the location update may not be performed because one has entered a new cell.

Moreover, the mobile station 140 can perform a normal location update when the timer T3212 expires (starting periodic update); it does not have to perform an IMSI detach; it can support a request for emergency calls; it can use other requests from the CM layer as a trigger for the normal location update procedure (if the location update procedure goes through, then the MM connection request is accepted); or it can reply to the paging, for example with the IMSI code.

Other possibilities for allowing the mobile station 140 to connect or reconnect to the base station 105 after sending identification information such as its IMEI to the NFF base station 115 include use of the abort procedure. The abort procedure can be invoked by the GSM network associated with the base station 105, or with the NFF base station 115, in order to abort any mobility management (MM) connection in progress or established. The mobile station 140 generally treats an abort message as compatible with the current protocol state if it is received when at least one MM connection exists or when an MM connection is established.

The abort procedure can be initiated by the GSM network or by the NFF base station 115 and can include the abort message sent by the GSM network to the mobile station 140. Before sending the abort message, the network generally releases locally any MM connection in progress. After sending the abort message the network can start the normal RR connection release procedure. A cause information element generally indicates the reason of the abort, such as illegal mobile equipment or a network failure.

The mobile station 140 also can start the abort procedure. Generally, following reception of the abort message the mobile station 140 aborts any establishment of an MM connection or call reestablishment procedure and releases any MM connection. The mobile station 140 can also delete any TMSI, LAI and encryption key sequence numbers stored in the SIM, set the update state to ROAMING NOT ALLOWED, store this state in the SIM, and consider the SIM invalid until power-off or until the SIM is removed. Consequently, the mobile station 140 enters the MM IDLE state and the NO IMSI sub-state after release of the RR connection. The mobile station 140 can then wait for the network to release the RR connection. Typically, a Cause Information Element that indicates a network failure would not release all the MM connections in progress at the NFF base station 115.

If the mobile station 140 is camped on the NFF base station 115, it may be unable to receive downlink calls. Therefore, once the base station 115 has obtained identity information such as the IMEI of the mobile station 140, the mobile station 140 should reconnect to the GSM network as quickly as possible in order to listen to the correct paging channel. In a typical embodiment based on failure of downlink signaling, the mobile station 140 may be unreachable to the GSM network for 5.3 seconds. If the mobile station 140 remains within the NFF base station field 120, it can camp again on the NFF base station 115 after 15 seconds, and can remain camped on the NFF base station 115 for another 5.3 seconds before camping again on the GSM network. In this exemplifying embodiment, this cycle can repeat as long as the mobile station 140 remains within the NFF base station field 120 and may be unreachable for a caller approximately for 26% of the time. In order to minimize this fact, the NFF base station field 120 is generally the minimum area needed for the mobile station 140 to camp thereon and transmit an identity signal, so that during the reselection process the mobile station 140 camps on the base station 105 and does not recamp on the NFF base station 115. In one embodiment, the NFF base station field 120 covers a circular area with a radius of approximately 50 cm, so that the subscriber 145 who carries the mobile device 147 must actively move closer or bring the mobile device 147 into the NFF base station field 120 for camping to occur. The delimited NFF base station field 120 prevents unwanted camping on the NFF base station filed 120 of mobile devices that are not participating in the payment process.

In situations in which the mobile station 140 is in a dedicated mode, for example when the subscriber 145 is talking on the mobile phone, a connection between the mobile station 140 and the NFF base station 115 can be established by listening to measurement reports of the dedicated mobile station 140, decoding them, and storing the Temporary Mobile Subscriber Identifier (TMSI) in a temporary buffer memory. If the mobile station 140 connects subsequently to a second NFF base station in the network, it can send the same TMSI together with the location update. In some situations, if the mobile station 140 is in dedicated mode and passes within the NFF base station field 120, the systems and methods of the invention also select a BSIC (Base Station Identity Code) and a BSIC frequency so that they not interrupt a call in progress because of a handover failure.

In a typical embodiment, the Rejected Location Update procedure that entails a "retry upon entering a new cell" is the best possible cause of rejection. When this cause is used, the mobile station 140 performs a Location Update Procedure when entering a new Location Area, or, for example, after four failed Location Update attempts when entering a cell (i.e., a base station field 110 or an NFF base station field 120).

The systems and methods of the present invention are robust enough to deal with embodiments in which the base station 105 authenticates itself with the mobile station 140 as part of a GSM network or other network. In this embodiment, the NFF base station 115 requests identification information from the mobile station 140 before an authentication or encryption procedure occurs. In this manner, the NFF base station 115 can still receive the desired identification information.

The systems and methods of the present invention provide access to the IMEI number of a mobile station 140 without substantial interference with standard mobile services. Generally, by adapting and optimizing IMSI catcher devices in order to create IMEI catcher devices, the systems and methods described here allow automated payments based on technology compatible with the GSM network. In a preferred embodiment, the mobile station 140 is in inactive mode (stand-by). However, other operating modes are possible. By increasing the quantity of required equipment and measurements, the numbers of failed registrations of dedicated mobile stations 140 is minimized.

A preferred embodiment of the NFF base station 115 is now discussed with reference to FIGS. 4 to 11.

Figure 4:
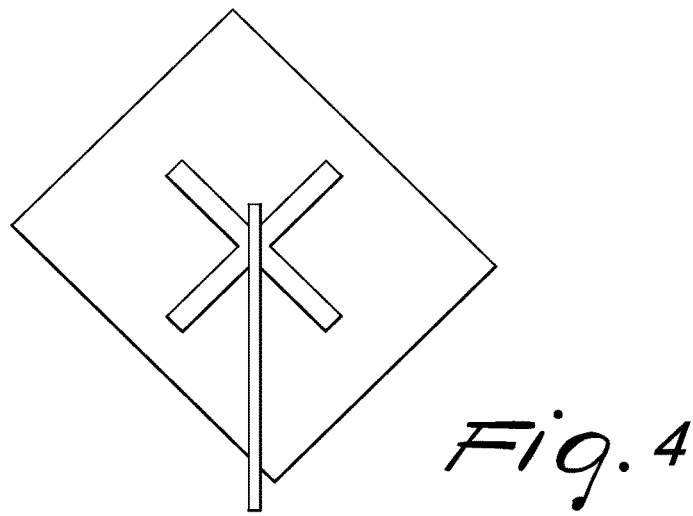
FIG. 4 is a view of an array element of a microstrip antenna that can be used in an embodiment according to the present invention.
Figure 5:
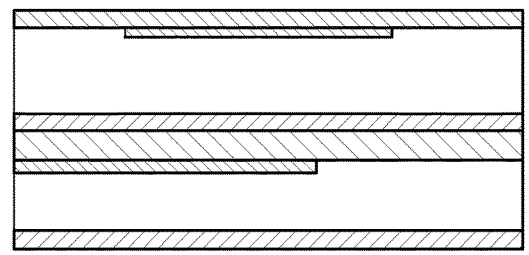
FIG. 5 is a view of a stacking of the array element of FIG. 4.

The transmitter 125 can be an antenna formed by a planar array of microstrip antennas. A configuration of the array element that operates at 18000 MHz is shown in FIG. 4, together with its maximum dimensions, while the stacking of the printed structure is illustrated in FIG. 5.

The rectangular patch and the x-slot generate an electrical field with circular polarization. FIG. 6 illustrates the characteristics of the system. The microstrip antenna shown in FIGS. 4 and 5 is used to build a planar array of 8×8 patches; the array is organized in a rectangular grid divided into four sub-arrays. A phase difference can be introduced between feeds of elements in order to focus the electromagnetic field at a distance of 1.5 m from the antenna panel. A width taper has been included in order to reduce the Side Lobe Level (SLL) in the near field region. The overall dimensions of the array are approximately 82×82 cm$^2$ with a space of 0.6λ0 between the patches.

Figure 7:
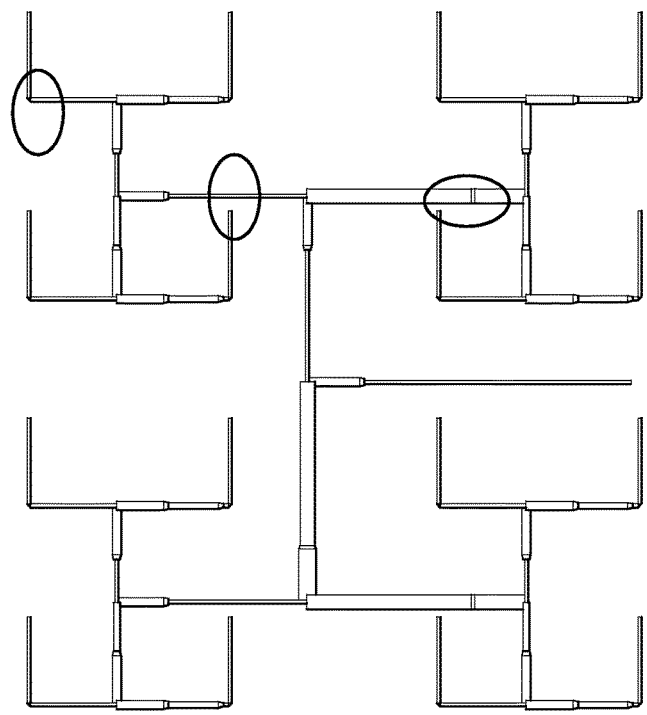
FIG. 7 is a view of a supply line of a 4×4 sub-array of a microstrip antenna according to the present invention.

As regards the array structure, first the feed line of the 4×4 sub-array illustrated in FIG. 7 was designed. A 20 dB Taylor width taper has been used in order to reduce SLL. A group of different power dividers has been designed.

Figure 8:
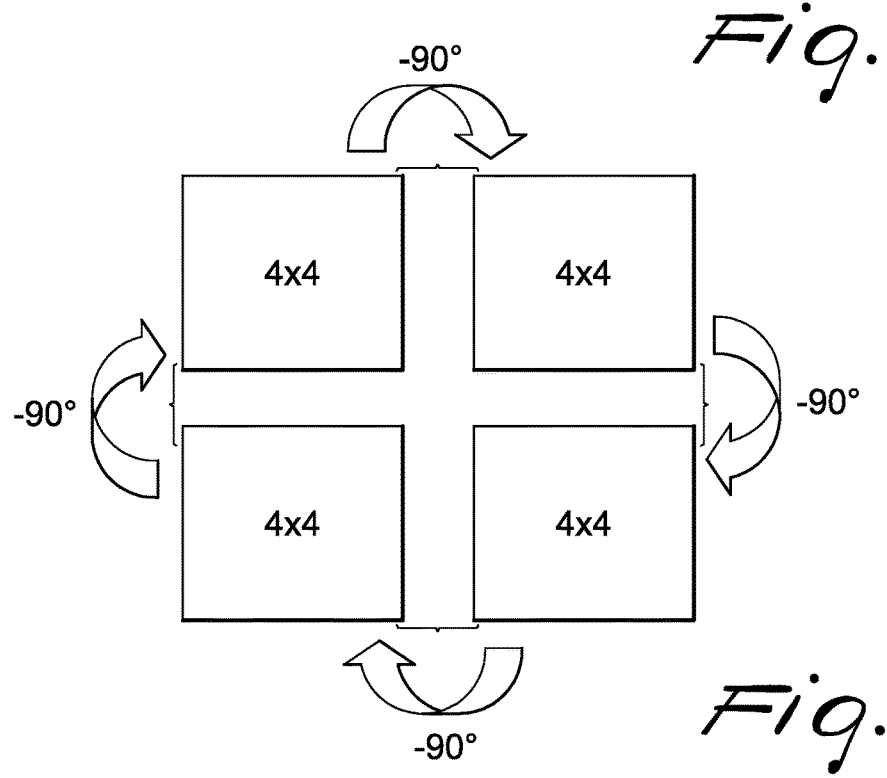
FIG. 8 is a view of the entire structure of the array of a microstrip antenna according to the present invention.

In order to obtain a circular polarized array, an almost sequential rotation technique has been implemented. In particular, each one of the four 4×4 sub-arrays has been rotated through −90° with respect to the adjacent sub-array, as shown in FIG. 8.

Each sub-array has been fed respectively with a current phase of 0°, 90°, 180° and 270°, in order to compensate the rotation of the individual element. In order to obtain the required phase shift, a λg/4 line has been used between the horizontally aligned sub-array and a 2 line between the upper and lower 4×8 sub-arrays (λg is the wavelength of the microstrip).

Figure 9:
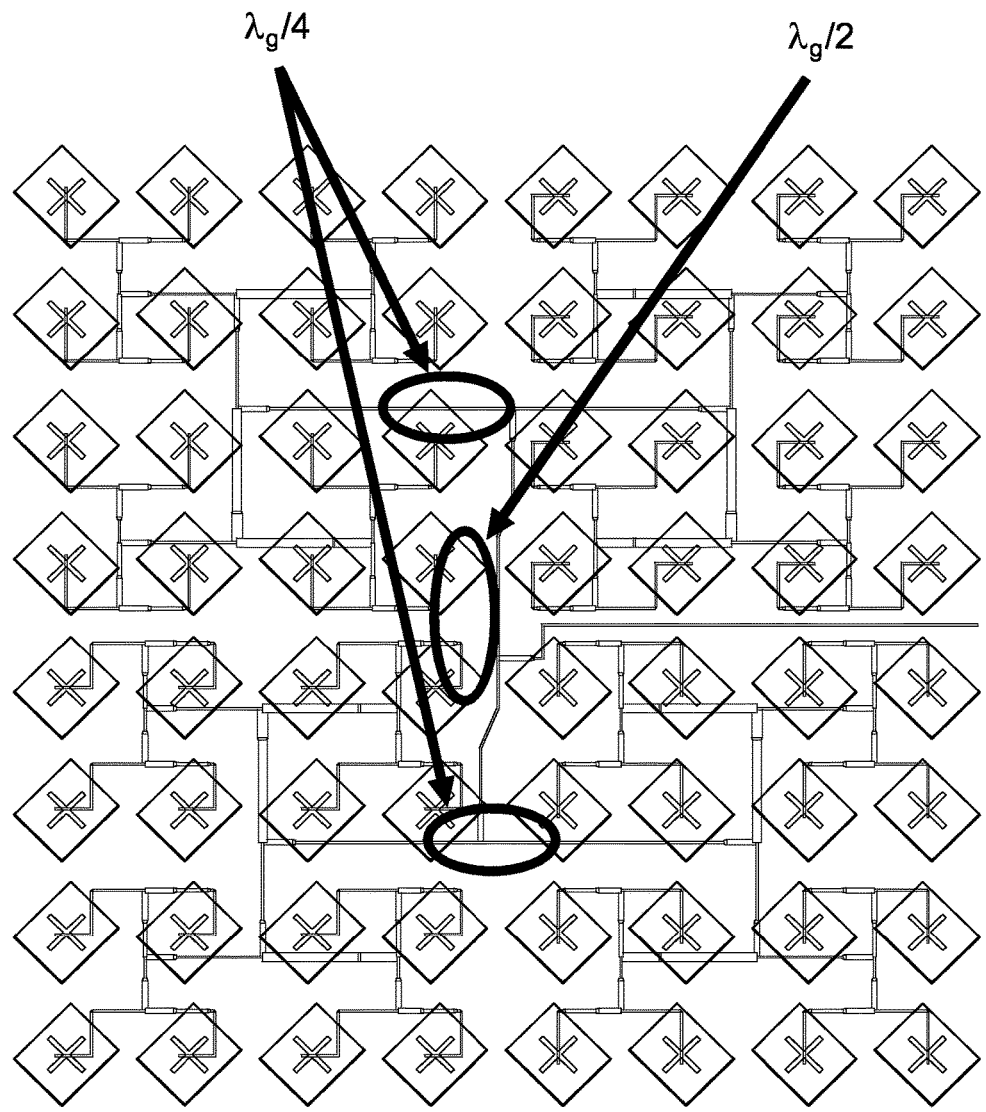
FIG. 9 is a view of the array structure comprising patches, slots and supply line of a microstrip antenna according to the present invention.

FIG. 9 illustrates the entire structure of the array. A full-wave EM simulation on the entire 8×8 array shows a Return Loss of less than −17 dB in the 180 GSM band (1710-1880 MHz). At 1800 MHz and at the focal distance, 1.5 m, the −3 dB point has a good circular symmetry with a radius of 30 cm.

The Axial Ratio (AR) is the parameter used to evaluate the performance of the circular polarization:

$$AR = \frac{|E_r + E_l|}{||E_r| - |E_l||}$$

$E_r$ and $E_l$ are respectively the right component and the left component of the electrical field.

For perfect circular polarization, AR should be equal to one (0 dB). The Axial Ratio at 1800 MHz for the 8×8 array in the −3 dB point area is less than 1 dB. Thanks to the 20 dB Taylor width taper, the array has an SLL equal to −21 dB.

Figure 10:
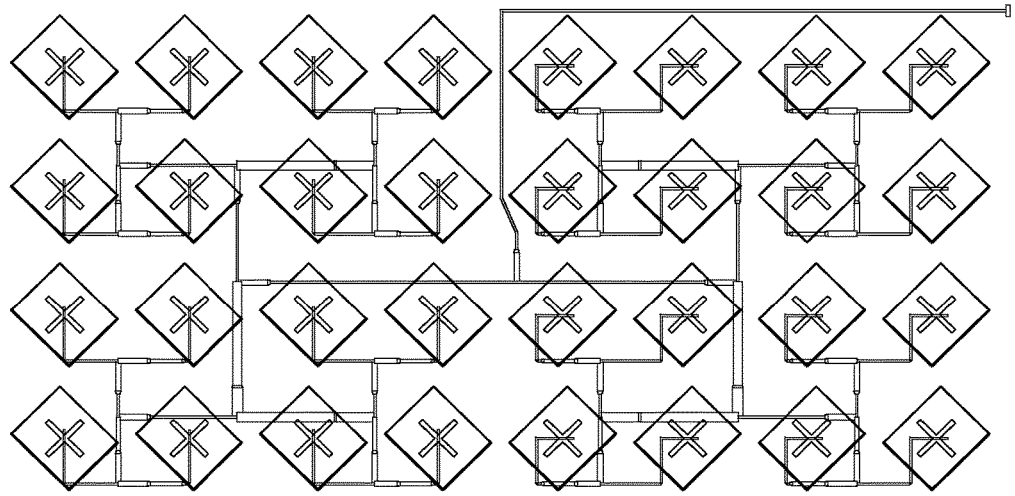
FIG. 10 and FIG. 11 are views of two 4×8 sub-arrays of the 8×8 array of a microstrip antenna according to the present invention.
Figure 11:
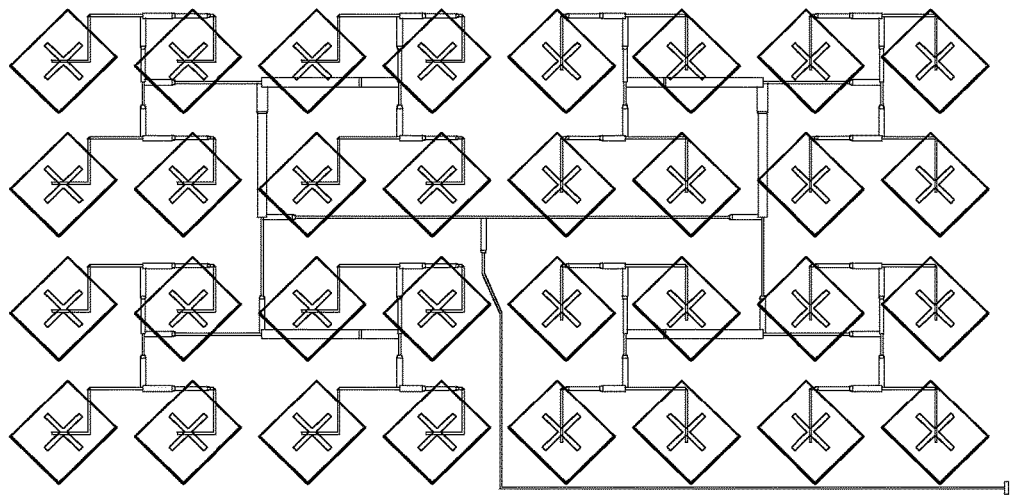

The 8×8 array is divided in two 4×8 sub-arrays, in order to simplify the prototyping of the antenna. The two sub-arrays are illustrated in FIG. 10 and in FIG. 11.

The feed lines reach the edge of the sublayer where they are connected, by means of an SMA connector, to 50Ω coaxial cables. In order to obtain the 180° phase difference between prototype A and prototype B, the coaxial cables differ by λg/2 in length. They are both connected to a commercial power divider. In order to assemble different antenna sublayers, first of all the aluminum ground plane was prepared with 42 holes.

A few Teflon screws were placed in each hole in order to locate the Teflon spacers with a thickness of 0.4 mm, according to the antenna stacking of FIG. 5.

The Arlon D300 sublayers of the two prototypes were soldered in order to obtain a single sublayer of 80×80 cm². The feed line is printed on the lower side of the Arlon AD300 sublayer, while slots are provided on the upper side. On the Arlon AD300 layer, a sublayer made of foam with a thickness of 1 cm was arranged and placed on the aluminum plane. At the two feed lines, reaching the edge sublayer, an SMA connector was soldered in order to connect said lines to the 50Ω coaxial cable. The FR4 sublayer with patches was placed at the end.

The antenna was connected to a VNA (Vector Network Analyzer) in order to verify its bandwidth performance. The measured Return Loss is lower than −10 dB in the GSM1800 band.

As regards dual band (dcsw-1800/UMTS) performance, the measured Return Loss of the 8×8 array meets the bandwidth specification also at the UNITS band, where the Return Loss is always lower than −10 dB. In this manner, the 8×8 array covers both the GSM1800 frequency band and the UNITS frequency band.

The antenna is capable of focusing also at the central frequency of the UMTS band, 2.05 GHz, but the SLL is only −12 dB. The poor SLL performance is due to the fact that the central frequency of the operating frequency band is a fundamental input parameter of the design process. In order to optimize the array feed network, the central frequency of the GSM1800 band was selected. Accordingly, better SLL performance is obtained at the GSM1800 band than at the upper UNITS band. In order to improve SLL performance at the UMTS band, accepting at the same time a smaller worsening at the GSM1800 band, it is simply necessary to design the feed network to the central frequency of the entire GSM1800-UNITS band (1710 MHz-2170 MHz).

It has been shown that the invention achieves the intended aim and objects, since it allows to perform a simple, convenient, quick and safe payment transaction using a mobile device.

In particular, it is clear that the systems and methods according to the embodiments of the invention can use existing mobile telephones and associated networks and do not require a dedicated device. The mobile phone, when it is positioned next to a local NFF base station, which mimics the signals of a conventional cellular telecommunications base station automatically, camps to the NFF base station in view of the stronger signal received by the local NFF base station compared to signals received by conventional base stations of the telecommunications network. A local communication is thus initiated with no access to the conventional telecommunications network. Nevertheless, since the local NFF base stations mimics signals of conventional base stations, each standard mobile phone that is capable to connect to a telecommunications standard can interact and communicate with the NFF base station. This increases effectiveness and compatibility and decreases cost.

As regards the preferred embodiment of the NFF base station, it has been shown that it is possible to use a width taper in order to reduce levels of lateral lobes that are distant from the "hot spot" region. The enlargement of the focused area (with respect to an excitation of uniform extent), which is a known collateral effect of the width taper, is on the order of only a few centimeters. The implementation of circular polarization, as an alternative to the linear polarization implemented in the background art, ensures good performance of the communications system regardless of the orientation of the mobile telephone. The proposed antenna meets Return Loss specifications at the UNITS band as well and, by designing the array feed network at the central frequency of the entire frequency band of interest (1710 MHz-2170 MHz) it is possible to improve its SLL performance. The consequent worsening of SLL performance at the GSM1800 band would be on the order of only a few dBs. If required, a width taper different from the Taylor taper used in the preferred embodiment might be implemented in order to obtain a suitable SLL performance both at the GSM1800 band and at the UNITS band.

Of course, numerous modifications will be evident and can be made promptly by persons skilled in the art without abandoning the scope of the present invention.

Therefore, the scope of the claims shall not be limited by the illustrations or by the preferred embodiments provided in the description in the form of examples, but rather the claims shall include all the patentable novelty characteristics that reside in the present invention, including all the characteristics that would be treated as equivalent by the person skilled in the art.

The disclosures in Italian Patent Application No. MI2011A000193 from which this application claims priority are incorporated herein by reference.

The invention claimed is:

1. A method for automatic electronic payment based on the detection of a mobile station adapted to operate in a cellular telecommunications network, the method comprising:
    transmitting, on the part of a transmitter associated with a Near Field Focused (NFF) base station, which is external to the cellular telecommunications network and not part of the cellular telecommunications network and which does not connect outgoing or uplink calls, a signal that indicates the presence of the NFF base station by mimicking the signal of a base station of the cellular telecommunications network, wherein the frequency used by the NFF base station is an item of a Broadcast Control Channel (BCCH) allocation list of the base station, and the NFF base station has a Location Area Identity (LAI) that comprises a Mobile Country Code (MCC) and a Mobile Network Code (MNC) of the cellular telecommunications network associated with the base station to which the mobile station is currently connected;
    detecting, on the part of a receiver associated with the NFF base station, a request for connection to the NFF base station that originates from the mobile station;
    transmitting, on the part of the transmitter, an identity request signal to the mobile station;
    detecting, on the part of the receiver, an identity reply signal sent by the mobile station;
    determining identification data of a subscriber who is associated with the mobile station on the basis of the detected identity reply signal; and
    billing the subscriber on the basis of the determined subscriber identification data, wherein billing includes:
        a) sending, on the part of a communications device associated with the NFF base station, the subscriber identification data and an amount to be paid to a subscriber server;
        b) extracting, on the part of the subscriber server, a plurality of billing parameters associated with the subscriber;
        c) sending, on the part of the subscriber server, the plurality of billing parameters and the amount to be paid to a payment server; and
        d) billing, on the part of the subscriber server, the amount to be paid to the subscriber on the basis of the plurality of billing parameters.

2. The method according to claim 1, further comprising, before sending the plurality of billing:
    sending, on the part of the subscriber server, an authorization request to the mobile station;
    sending, on the part of the mobile station, an authorization reply to the subscriber server; and
    evaluating, on the part of the subscriber server, whether to perform step c) or not depending on the authorization reply.

3. The method according to claim 1, wherein the plurality of billing parameters includes a credit card number or a bank account identifier and the billing includes at least one of billing the credit card associated with the credit card number and billing the bank account associated with the bank account identifier.

4. The method according to claim 1, further comprising:
    performing a connection between the mobile station and the NFF base station before transmission of the identity request signal; and
    detecting the identity reply signal, including:
        releasing the connection between the mobile station and the NFF base station; and
        connecting the mobile station to a base station which is associated with the cellular telecommunications network.

5. The method according to claim 1, wherein said NFF base station being further configured to reject requests for an uplink call.

6. An automatic electronic payment system based on the detection of a mobile station adapted to operate in a cellular telecommunications network, the system comprising:
    a Near Field Focused (NFF) base station, the NFF base station being external to the cellular telecommunications network and not part of the cellular telecommunications network and which does not connect outgoing or uplink calls, and the NFF base station mimicking cellular signal of a base station of the cellular telecommunications network, wherein the frequency used by the NFF base station is an item of a Broadcast Control Channel (BCCH) allocation list of the base station, and the NFF base station has a Location Area Identity (LAI) that comprises a Mobile Country Code (MCC) and a Mobile Network Code (MNC) of the cellular telecommunications network associated with the base station to which the mobile station is currently connected
    a transmitter, associated with the NFF base station, adapted to transmit signals that indicate the presence of the NFF base station and to transmit an identity request signal to the mobile station;
    a receiver, which is associated with the NFF base station, adapted to detect a request for connection to the NFF base station on the part of the mobile station and to detect an identity reply signal which is adapted to identify uniquely the mobile station;
    a processor, which is adapted to determine identification data of a subscriber associated with the mobile station on the basis of the detected identity reply signal, and adapted to bill the subscriber on the basis of the determined subscriber identification data;
    a communications device, which is associated with the NFF base station and is adapted to send the determined subscriber identification data and an amount to be paid to a subscriber server which is adapted to extract billing parameters associated with the subscriber and to send the billing parameters and the amount to be paid to a payment server; and
    a payment server, which is adapted to bill the amount to be paid to the subscriber on the basis of the billing parameters.

7. The system according to claim 6, wherein the mobile station is adapted to establish a connection between the mobile station and the NFF base station before sending the identity reply signal; and wherein the mobile station is further adapted to release the connection between the mobile station and the NFF base station and to connect to a base station which is associated with the cellular telecommunications network after the receiver has detected the identity reply signal.

8. The system according to claim 6, wherein the identity request signal to the mobile station comprises a signal requesting an IMEI code associated with the mobile station and the identity reply signal comprises the transmission of the IMEI code associated with the mobile station.

9. The system according to claim 6, wherein the subscriber server is adapted to compare the detected identity reply signal with a subscriber database which contains data associated with a plurality of subscribers, and the processor is adapted to check that the detected identity reply signal is associated with one of the plurality of subscribers.

10. The system according to claim 6, wherein the billing parameters comprises a credit card number and the payment server is adapted to bill the credit card associated with the credit card number.

11. The system according to claim 6, wherein the billing parameters comprises a bank account identifier and the payment server is adapted to bill the bank account associated with the bank account identifier.

12. The system according to claim 6, wherein said NFF base station is further configured to reject requests for an uplink call.

* * * * *